No. 828,964. PATENTED AUG. 21, 1906.
H. L. PHELPS.
FISH HOOK.
APPLICATION FILED AUG. 23, 1905.

Witnesses:
J. B. Weir
Robert H. Weir

Inventor:
Herbert L. Phelps
By Bulkley & Durand
Attorneys

UNITED STATES PATENT OFFICE.

HERBERT L. PHELPS, OF CHICAGO, ILLINOIS.

FISH-HOOK.

No. 828,964.  Specification of Letters Patent.  Patented Aug. 21, 1906.

Application filed August 23, 1905. Serial No. 275,504.

*To all whom it may concern:*

Be it known that I, HERBERT L. PHELPS, a citizen of the United States of America, and a resident of Chicago, Cook county, Illinois, have invented a certain new and useful Improvement in Fish-Hooks, of which the following is a specification.

It is a matter of common knowledge that the ordinary fish-hook cannot be satisfactorily used in bodies of water where the weeds grow thickly. Various attempts have been made to overcome this difficulty—that is, various kinds of so-called "weedless" fish-hooks have been evolved for the purpose of permitting fishing and trolling in weedy places. So far as I am aware, however, I am the first to propose a weedless hook having a guard which covers the point of the hook and which is subject to spring tension tending to disengage or expose the point of the hook as soon as the fish takes the hook. With such a provision the gap between the point and the shank of the hook is filled in or bridged over while the hook is being drawn through the weeds, preferably by a flat spring having one end secured to the end of the shank and its other end adapted to rest lightly upon the point of the hook. As soon as the spring is disturbed by the fish it springs quickly away from the point of the hook, thus leaving the latter exposed and in a position to perform its desired function. The nature and advantages of my invention will, however, hereinafter more fully appear.

Figure 1:
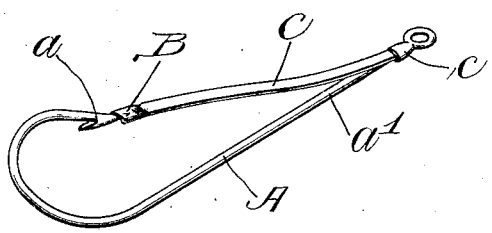
Figure 2:
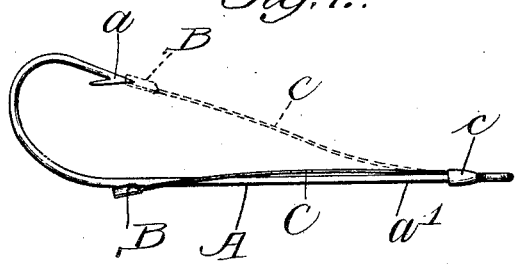
Figure 3:
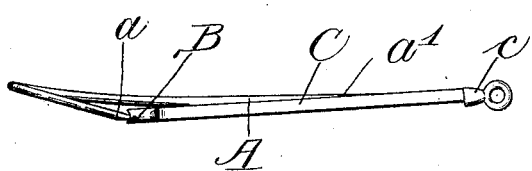
Figure 4:
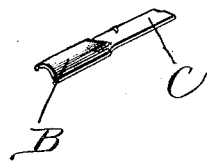

In the accompanying drawings, Figure 1 is a perspective of a fish-hook embodying the principles of my invention, showing the same with the guard in position to cover the point of the hook. Fig. 2 is a side elevation of the said hook, showing the guard in full lines away from the point and bearing upon the point in dotted lines. Fig. 3 is a view looking down on the hook shown in Fig. 2. Fig. 4 is an enlarged perspective of the guard or end portion of the spring.

As thus illustrated, the hook A can be of any suitable known or approved character and provided with the usual barb or point a. The guard consists of a curved or suitably-formed end portion B, secured to or formed integral with the flat spring C. It will be seen that the other end of this spring is suitably secured to the shank a' of the hook—as, for example, by the securing means c. The spring is so tensioned that the guard B can be raised and allowed to rest lightly against the point or end portion of the hook, as shown in Figs. 1 and 3 in full lines and in Fig. 2 in dotted lines. Owing to its flexibility and spring tension, the said spring slides off from the point of the hook as soon as the latter is grasped by a fish, thus bringing the point or barb of the hook into play as soon as the fish takes the hook. With such an arrangement the tension of the spring tends always when the guard is in position to prevent weeds from becoming entangled in the hook to disengage the guard from the point of the hook and is effective in so doing as soon as the spring is sufficiently flexed or bent one way or the other sufficiently to draw the guard B off from the point of the hook. In other words, the guard springs quickly away from the point of the hook as soon as it is free from the point of the hook and does so of its own accord and by reason of its tension. Thus the hook can be used in weedy places without danger of its becoming entangled in the weeds, but is at the same time fully as effective in hooking the fish as an ordinary hook.

The hook can be provided with an eye or other suitable means for attaching it to a fish-line. It will be seen that the guard is so shaped and tensioned that when sprung (see Fig. 2) it lies flatwise upon the shank, and thus leaves the throat of the hook clear or unobstructed.

What I claim as my invention is—

1. In a fish-hook, a shank, a barb and point, suitable means for connecting the hook with a line, and a flat-spring guard rigidly secured at one end to the shank and engaging the outside of the point with its free end, said guard tensioned to spring back upon the shank when disengaged from the point of the hook, the free end portion of the guard provided on its inner surface with a longitudinal groove to receive the point of the hook, said guard being poised on the outside of the point of the hook and adapted to disengage therefrom when a fish takes the hook, substantially as and for the purpose set forth.

2. In a fish-hook, a shank, a point, a barb, suitable means for connecting the hook with a line, and a guard adapted to engage and fully cover the outside of the point and tensioned to spring back flatwise upon the shank when disengaged therefrom, the said guard being adapted to leave the throat of the hook clear or unobstructed when disengaged from normal or guarding position, and said guard being poised on the outside of the point of the hook and adapted to disengage therefrom when a fish takes the hook, substantially as and for the purpose set forth.

Signed by me, at Chicago, Illinois, this 15th day of August, 1905.

HERBERT L. PHELPS.

Witnesses:
 EDW. J. BEST,
 ALBERT SAUSER.